United States Patent
König et al.

(10) Patent No.: US 12,499,291 B2
(45) Date of Patent: Dec. 16, 2025

(54) SHEET METAL FORMING AND ASSEMBLY SIMULATION METHOD

(71) Applicant: AutoForm Engineering GmbH, Pfäffikon SZ (CH)

(72) Inventors: Peter König, Pfäffikon SZ (CH); Florian Mahle, Pfäffikon SZ (CH)

(73) Assignee: AutoForm Engineering GmbH, Pfäffikon SZ (CH)

( * ) Notice: Subject to any disclaimer, the term of this patent is extended or adjusted under 35 U.S.C. 154(b) by 1060 days.

(21) Appl. No.: 17/304,763

(22) Filed: Jun. 25, 2021

(65) Prior Publication Data

US 2021/0406424 A1 Dec. 30, 2021

(30) Foreign Application Priority Data

Jun. 26, 2020 (CH) ...................... 00775/20

(51) Int. Cl.
*G06F 30/20* (2020.01)
*G06F 30/10* (2020.01)

(52) U.S. Cl.
CPC .............. *G06F 30/20* (2020.01); *G06F 30/10* (2020.01)

(58) Field of Classification Search
CPC .......... G06F 30/20; G06F 30/25; G06F 30/27; G06F 30/28; G06F 30/10; G06F 30/00
See application file for complete search history.

(56) References Cited

U.S. PATENT DOCUMENTS

2019/0291163 A1* 9/2019 Birkert .................. B21D 22/26

FOREIGN PATENT DOCUMENTS

DE 102005044197 A1 * 3/2007 ............ G06F 17/50

OTHER PUBLICATIONS

Advanced Simulation Technology Using LS-DynaÂ® for Automotive Body Manufacturing Process: From Stamping to Assembly (Year: 2009).*
Li Zhang et al: "Advanced Simulation Technology Using LS-DYNA for Automotive Body Manufacturing Process: From Stamping to Assembly", Jan. 1, 2009, pp. 1-13.
(Continued)

*Primary Examiner* — John E Johansen
*Assistant Examiner* — Michael Paul Mirabito
(74) *Attorney, Agent, or Firm* — Oppedahl Patent Law Firm LLC

(57) ABSTRACT

A design method, for processes forming and assembling parts, begins by simulating a forming process (2) to generate a sprung back part simulation model (30) that corresponds to a reference geometry (10) of the formed part (3). Next, an assembly simulation (40) uses this sprung back model (30) to create an assembled sprung back part simulated model (50). If the geometry of this assembled model (50) does not match the reference geometry (10), a compensated sprung back part geometry (60) is iteratively adapted, and the assembly simulation (40) is repeated until the assembled model (50) aligns with the reference geometry (10). The final optimized geometry (60) can then be used to design and manufacture both the parts and the tools needed for forming them. The method avoids an iterative repetition of forming simulations, which allows a user interacting with the process to work in a more efficient manner.

11 Claims, 2 Drawing Sheets

(56) References Cited

OTHER PUBLICATIONS

Govik Alexander et al: "The effects of forming history on sheet metal assembly", International Journal of Material Forming, vol. 7, pp. 305-316, Apr. 23, 2013.
S.M. Afazov: "Modelling and simulation of manufacturing process chains", CIRP Journal of Manufacturing Science and Technology, vol. 6, pp. 70-77, Nov. 20, 2012.
M. F. Zaeh et al: "Simulation of the manufacturing process chain of welded frame structures", Production Engineering, vol. 2, pp. 385-393, Jul. 31, 2008.

* cited by examiner

SHEET METAL FORMING AND ASSEMBLY SIMULATION METHOD

The invention relates to the field of designing processes for manufacturing of parts, in particular of sheet metal parts, and tools for their manufacturing. It relates to a method for simulating and optimising a process of forming and assembling parts.

BACKGROUND

When designing processes and tools for manufacturing parts made by sheet metal forming processes, and for subsequent assembly of several such formed parts, it is known to numerically simulate, using FEM (Finite Element Method) models, both the forming processes and the assembly processes. Such simulations take the geometry and material properties of the parts into account, compute internal states such as stresses and strains as parts are subjected to machining and assembly tools and forces, and compute the geometry and internal states of the parts after forming and assembly, respectively. Assessing the results after the simulation of the assembly process can show issues related to undesired deformation of parts, or of damage caused by excessive internal forces. Based on such an assessment, one may modify the design of the assembly, and thus also of the parts, in order to avoid the issues. Given the modified design, the simulation of the forming and assembly operations can be repeated. However, the design process can be complex, and the repeated execution of such simulations can be computationally expensive.

It is therefore an object of the invention to create a method for simulating and optimising a process of forming and assembling parts of the type mentioned initially, which is more efficient than known methods, in particular with regard to computational effort.

SUMMARY OF THE INVENTION

This object is achieved by a method for simulating and optimising a process of forming and assembling parts according to the claims.

The computer-implemented method serves for simulating and optimising a process of forming and assembling parts, wherein the process comprises
   at least one forming process for generating at least one associated formed part, in particular from a sheet metal blank, and
   an assembly process for generating an assembled part from the at least one formed part and at least one second part,
   wherein
   the at least one forming process is simulated by a forming simulation, thereby generating a sprung back part simulation model corresponding to a reference geometry of the at least one formed part;
   the assembly process is simulated by an assembly simulation, based on the sprung back part simulation model of the at least one formed part, and generating an assembled sprung back part simulated geometry;
   wherein, if the assembled sprung back part simulated geometry does not match the reference geometry, a compensated sprung back part geometry is iteratively adapted, simulating the assembly process by an assembly simulation based on the compensated sprung back part geometry, generating, in an assembly operation iteration loop, iterated versions of the assembled sprung back part simulated geometry until the assembled sprung back part simulated geometry matches the reference geometry,
   the compensated sprung back part geometry corresponding to the assembled sprung back part simulated geometry that matches the reference geometry being an optimised compensated sprung back part geometry.

The assembled part sprung back simulated geometry not matching the reference geometry is understood to mean that a difference between the two geometries exceeds a threshold.

In this manner, the optimised compensated sprung back part geometry is determined without the need for computationally expensive multiple forming simulations.

Furthermore, by performing an optimisation within the assembly operation iteration loop, the complexity of the process as a whole is reduced, which allows a user interacting with the process to work in a more efficient manner.

In embodiments, the method comprises the further steps of, for the at least one formed part, determining a compensated tool geometry and parameters defining corresponding process for creating the at least one formed part with its sprung back part simulated geometry approximating or being equal to the optimised compensated sprung back part geometry.

In this way, parameters of the tools and processes, in particular the shape of the tools for the forming process are determined. This can be done in a single pass of the forming simulation. Since this compensated tool geometry and parameters are based on the optimised compensated sprung back part geometry, they can be called optimised compensated tool geometry and parameters In embodiments, the method comprises determining the optimised compensated tool geometry in a forming operation iteration loop, by iteratively modifying the compensated tool geometry and performing the forming simulation based on the compensated tool geometry, generating iterated versions of a sprung back part simulated model until the sprung back part simulated geometry matches the optimised compensated sprung back part geometry.

This allows to determine the optimised compensated tool geometry more accurately. This can be a final step of the method, and therein the iterative procedure is used to increase the accuracy of the final (optimised compensated) tool geometry. This is in contrast to an earlier stage of the procedure, where the result of the forming simulation is input to the assembly simulation, and a lower accuracy can be tolerated, and the assembly simulation can be performed just once, without iteratively adapting the tool geometry in order to achieve a desired reference geometry.

In embodiments, when in the assembly operation iteration loop the compensated sprung back part geometry is iteratively adapted, the assembly simulation is based on
   the geometry according to the compensated sprung back part geometry
   in combination with a sprung back part simulated internal state that is part of the sprung back part simulation model.

Although this combines the iteratively adapted geometry with the internal state from the original forming simulation, the resulting of the assembly simulation are sufficiently accurate. This saves the effort for determining the simulated internal state for every modified geometry of the compensated sprung back part geometry.

In embodiments, in order to use the sprung back part simulated internal state with the compensated sprung back part geometry, the sprung back part simulated geometry is registered to the compensated part geometry, or vice versa, creating a mapping between the two geometries, and based on this mapping, the sprung back part simulated internal state is mapped to the shape of the compensated sprung back part geometry.

The compensated sprung back part geometry together with the sprung back part simulated internal state mapped to this geometry thereby form a simulation model that is used as a starting point for the assembly simulation with respect to this part.

In embodiments, in the step of simulating the at least one forming process by the forming simulation, thereby generating the sprung back part simulation model, the sprung back part simulation model is determined by a single execution of the forming simulation.

The sprung back part simulation model thus is determined without iterative adaptation of the tool geometry according to the reference geometry. Depending on circumstances, this can be sufficiently accurate since it creates a starting point for subsequent iteration loops.

In embodiments, in the step of simulating the at least one forming process by the forming simulation, thereby generating the sprung back part simulation model, the sprung back part simulation model is determined by a forming operation iteration loop, replacing the tool geometry by an iteratively adapted tool geometry and performing the forming simulation until the deviation of the sprung back part simulated geometry from the reference geometry is sufficiently small.

The sprung back part simulation model thus is determined with an iterative adaptation of the tool geometry, bringing the sprung back part simulated geometry closer to the reference geometry. Depending on circumstances, this can improve the efficiency of subsequent iteration loops by providing a better starting point.

In embodiments, the assembly process comprises one or more of welding two or more parts, hemming and seaming of parts, and correspondingly the assembly simulation comprises one or more of a simulation of welding, hemming or seaming.

A method for designing a tool for manufacturing a part comprises performing the steps for simulating and optimising a process of forming and assembling parts, thereby determining the compensated reference geometry, and manufacturing the tool with a shape defined by the compensated reference geometry.

A method for designing a part to be manufactured using a tool comprises performing the steps for simulating and optimising a process of forming and assembling parts thereby determining the compensated reference geometry, and manufacturing the part with a shape defined by the compensated sprung back part geometry, and optionally manufacturing an assembly comprising the part.

The method is particularly well suited for the manufacturing process comprising a forming process being a sheet metal forming process, and a subsequent process for assembling parts. The process for assembling parts can comprise an assembly process and/or involve hemming and/or seaming.

In an assembly process, an assembled part is assembled from two or more sub-parts or component parts. Assembling the component parts can cause them to be deformed, deviating from a desired nominal geometry or reference geometry.

The geometry of the part describes the geometrical shape of the part. The reference geometry typically is created as a CAD model. With this geometry as a target, a tool for the forming process is designed, and the forming process using this tool is simulated. Typically, this is done by means of a finite element method (FEM). An FEM model resulting from the simulation of the forming process represents the state of the part, which can comprise at least the part's geometry and the internal state of the material of the part, in particular internal stresses. The state can be considered to be a result of the simulation.

A tool for a forming process can comprise, for example, a punch and/or a die in a deep drawing press station or in a progressive die or line or transfer press, driven by mechanical, hydraulic or servo actuation.

A computer program for the method for simulating and optimising a process of forming and assembling parts according to the invention is loadable into an internal memory of a digital computer, and comprises computer program code to make, when said computer program code means is loaded in the computer, the computer execute the method according to the invention. In a preferred embodiment of the invention, the computer program product comprises a computer readable medium, having the computer program code means recorded thereon. A corresponding data processing system is programmed to execute the method, in particular by being programmed with the computer program codes. A method of manufacturing a non-transitory computer readable medium, comprises the step of storing, on the computer readable medium, computer-executable instructions which when executed by a processor of a computing system, cause the computing system to perform the method for simulating and optimising a process of forming and assembling parts.

Further preferred embodiments are evident from the dependent patent claims.

DESCRIPTION OF THE DRAWING

The subject matter of the invention will be explained in more detail in the following text with reference to preferred exemplary embodiments which are illustrated in the attached drawing, which schematically shows.

In principle, identical or functionally identical elements are provided with the same reference symbols in the figures.

DETAILED DESCRIPTION

Figure 1:
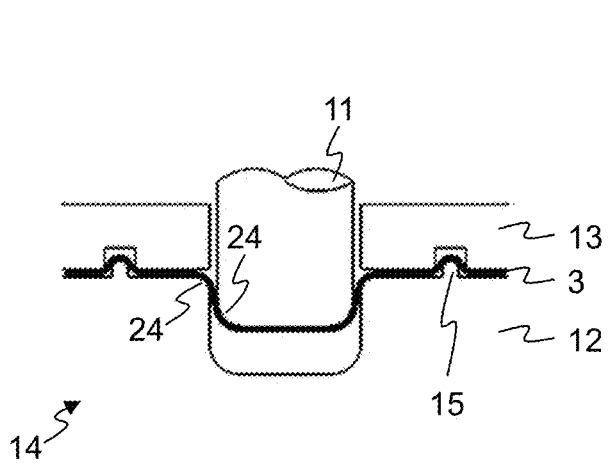
FIG. 1 a tool for forming a part by deep drawing.

FIG. 1 shows a tool 14 for forming a part 3, the tool 14 comprising a punch 11, a die 12 and a blank holder 13. The part 3 is held against the die 12 by means of the blank holder 13. The tool 14 is arranged in a forming press, not shown. During the forming operation, the part 3 is held between the die 12 and the blank holder 13, the punch 11 is moved towards the die 12, or vice versa, and the part 3 is formed according the shape of the tool 14. This involves pulling and stretching the part 3 over radii 24 of the tool 14. In order to control the flow of the part material, drawbeads 15 can be arranged at the periphery of the tool 14, holding back the flow of material. The tool shown corresponds to a deep drawing forming operation, but the method described herein is applicable to other forming methods. The shape of the part 3 is not uniquely determined by the shape of the tool 14, but is also determined by effects such as springback, thickening and thinning of the material by the forming process, etc. A forming operation can comprise a single forming step or a sequence of forming steps.

Figure 2:
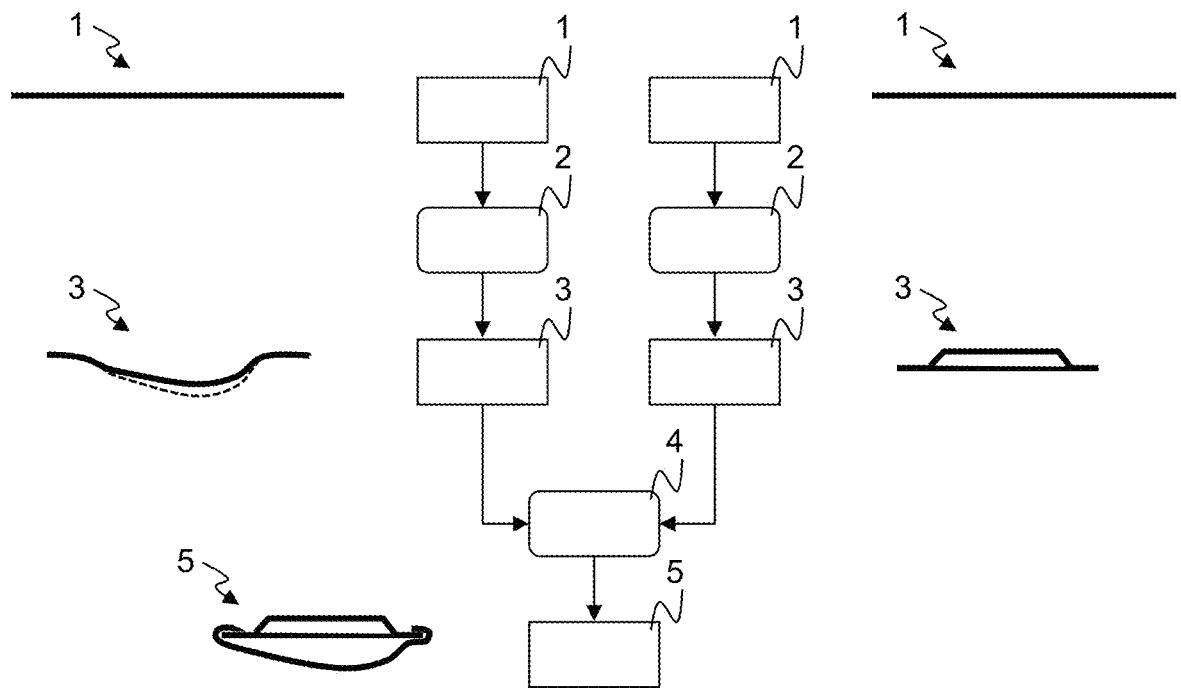
FIG. 2 a manufacturing process for forming parts and creating an assembly of parts.

FIG. 2 schematically shows a manufacturing process for creating an assembly of parts, or assembled part 5, from two or more parts 3. In different forming processes 2, formed parts 3 are generated from blanks 1. The left side of FIG. 2 very schematically shows a formed part 3 without springback, with a dotted line, its shape corresponding to a geometry of the tool, and with springback, with a full line. The right side of FIG. 2 very schematically shows a formed part 3 in the shape of a reinforcement part.

The formed parts 3 are assembled in an assembly process 4, creating the assembled part 5. From the point of view of the assembled part 5, the formed parts 3 are considered to be components. The assembly process 4 typically involves joining or assembling the two parts by some kind of joining technology. Joining technologies can comprise, for example, welding, soldering, gluing, nuts and bolts, rivets, etc. The assembly process 4 can in particular also comprise hemming and/or seaming, that is, joining the components by folding one part over the other one or joining two components by folding them together. FIG. 2 very schematically shows the part from the left side assembled with the reinforcement part from the right side. The assembly process 4 can involve welding and/or seaming or hemming. This usually causes deformation of the parts involved.

Figure 3:
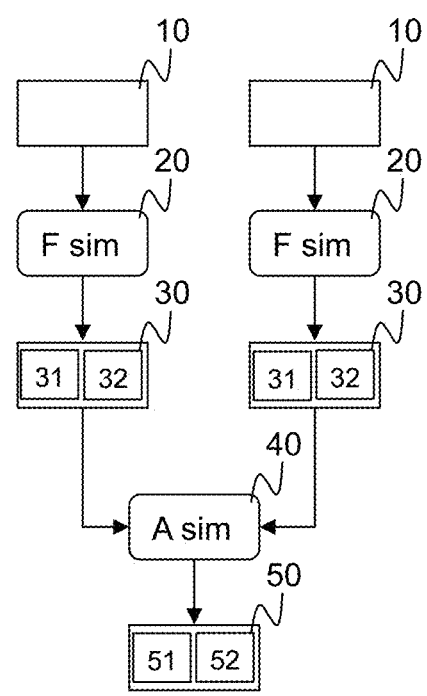
FIG. 3 a simplified structure of a corresponding simulation and design process.

FIG. 3 schematically shows a simplified structure of a corresponding simulation and design process used to model the real process of FIG. 2 and to design the parts and tools used. Based on a target geometry of the assembled part 5, reference geometries 10 of the parts making up the assembled part 5 are created. For each formed part 3, the reference geometry 10 is used to design a forming process for creating this part, in particular the geometry of the tool. Simulating this forming process in a forming simulation 20 results in a simulation model of the part. In order to differentiate this simulation model of the not yet assembled part, it shall be referred to as sprung back part simulation model 30.

The simulation determines the change in geometry from a sheet metal blank to the geometry of the formed part, and corresponding changes in the state of the material of the part. The simulation can be based on only the geometry of the part, and/or on the shape (or geometry) of the elements of the tool and operating parameters of the tool.

Methods for such simulations are generally known. They typically but not necessarily are FEM (Finite Element Method), wherein the part is modelled as comprising a finite number of material points arranged in a grid or mesh, and the behaviour of the part is determined for each of these material points, also called simulation points. The simulation can involve forward simulation, single step simulation and the like.

Results of such a simulation can include a state of the material during and after the forming operation, and the geometry of the part, that is, the shape of the part. The state can comprise stresses of the material in each simulation point, and other state variables such as strain, temperature, thinning and thickening effects. The state can be considered to be a result of the simulation.

The sprung back part simulation model 30 thus comprises a sprung back part simulated geometry 31 and a sprung back part simulated internal state 32.

Given the sprung back part simulation models 30, an assembly simulation 40 simulates the assembly of formed parts 3, based on the sprung back part simulation models 30. The assembly simulation 40 can thus involve the simulation of the assembly, hemming and/or seaming of parts.

Here too, a FEM simulation can be used. The result of the assembly simulation 40 is a further simulation model, which shall be referred to as assembled sprung back part simulation model 50. The assembled sprung back part simulation model 50 comprises an assembled sprung back part simulated geometry 51 and can also comprise an assembled sprung back part simulated internal state 52.

In embodiments, the assembly simulation 40 represents temperature effects. Such effects represent, for example, heating and heat dissipation in the material caused by welding, a resulting change of material properties, which in turn causes a resulting change in springback.

In the simulation, as in reality, the shape of the formed parts 3, represented by the sprung back part simulation model 30, does not correspond to the shape defined by the reference geometry 10, due to effects such as springback, thinning or thickening.

Subsequently, the shape of the parts after being assembled (assembled parts 5), represented by the assembled sprung back part simulation models 50, is changed again, and the assembled sprung back part simulated geometries 51 do not correspond to the desired reference geometries 10 of the respective parts. This deformation of the parts can be due to different stresses, thinning, thickening, deviations from the reference part within manufacturing tolerances or due to additional forming such as hemming or seaming.

The goal of a process for designing the manufacturing process (of forming and assembling parts) is to design the tools and the processes such that the final shape of one or more parts of interest in the assembled sprung back part simulated model 50 corresponds to the desired shape of the respective parts according to their respective reference geometry 10. Such parts of interest typically are visible parts at the outside of a structure, such as the body of a car. Other parts, not of interest with regard to their exact shape, are internal, supporting parts, such as reinforcements, usually not visible to a consumer. Generally, the reference geometry 10 of parts is given, and the tools and/or processes are designed accordingly. In some situations it can be necessary to modify the reference geometry 10 itself, This preferably is done for parts that are not of interest with regard to their exact shape.

Figure 4:
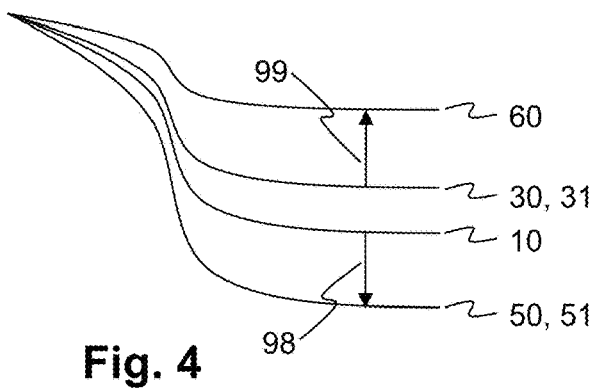
FIG. 4 different geometries related to the same part.

FIG. 4 shows different geometries of a single part in a cross section through half of the part. The second half could, for example be mirror symmetric to the half shown. Other parts that form the assembly—in the assembled state—are omitted.

The reference geometry 10 is the desired final shape of the part in the assembly or assembled part 5.

The assembled sprung back part simulated model 50 is the shape of the part after the assembly process 4, as determined by the assembly simulation 40, which in turn is based on the forming simulation 20. A deviation of the assembled sprung back part simulated geometry 51 from the reference geometry 10 ultimately needs to be compensated for. This deviation can be represented—for each point of the part—by a difference vector or deviation vector 98.

The sprung back part simulated geometry 31 is the shape of the part after the forming process 2, as determined by the forming simulation 20.

A compensated sprung back part geometry 60 is the shape that the formed part 3 should have prior to assembly, such that after the assembly process 4 its shape will match the reference geometry 10. In terms of the model, starting from the compensated sprung back part geometry 60, the assembled sprung back part simulated geometry 51 resulting from the assembly simulation 40 should match the reference geometry 10. A difference of the compensated sprung back part geometry 60 from the sprung back part simulated geometry 31 can be represented by a compensation vector 99.

Figure 5:
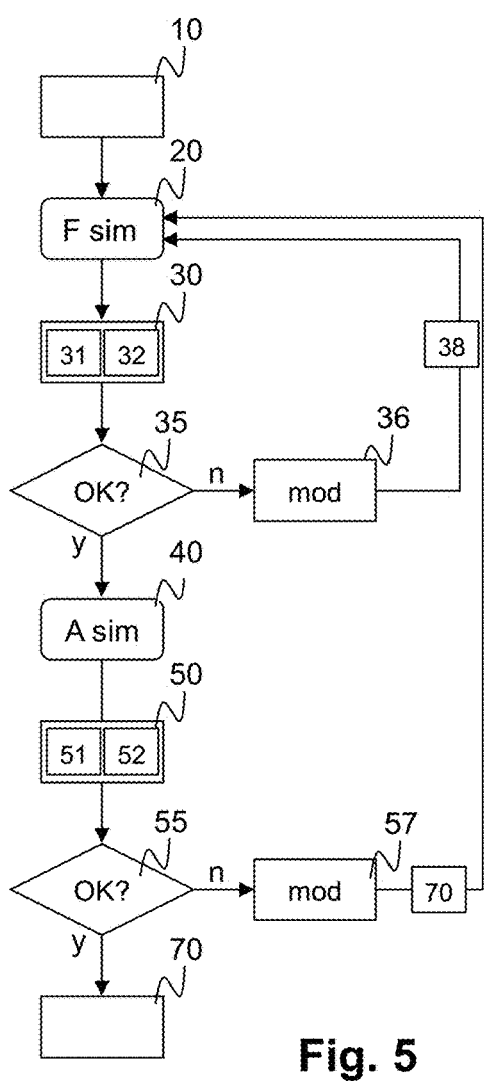
FIG. 5 a first method for designing the process of forming and assembling parts.

FIG. 5 represents a possible approach to design the process of forming and assembling parts: Based on a reference geometry 10 of a part when assembled to be part of an assembled part 5, a forming simulation 20 is performed. The forming simulation 20 simulates the use of tools whose geometry is defined by the reference geometry 10. The result of the forming simulation 20 is a sprung back part simulation model 30 comprising a sprung back part simulated geometry 31 and a sprung back part simulated internal state 32. In a comparison step 35, the sprung back part simulated geometry 31 is compared to the reference geometry 10. If the two do not match, in an adaptation step 36 the geometry of the tool 11, 12, 13, 14 is modified, or, in other words, replaced by a compensated tool geometry 38.

The comparison step 35 can be performed automatically, by computing an overall deviation and comparing it with a reference value. In embodiments, the comparison step 35 is performed by a human user. The human user can, for example, evaluate a visual representation of deviations of the sprung back part simulated geometry 31 from the reference geometry 10 and based on this decide whether (further) modification of the tool geometry is required, or whether the method can continue with the assembly simulation 40. Adaptation of the tool geometry can be performed, for example, by the user being guided by the visual representation of deviations.

The compensated tool geometry 38 compensates for the abovementioned effects of the forming process 2, such as springback. If the compensation is ideal, then shaping the tools according to the compensated tool geometry 38 and manufacturing the real formed parts 3 with these tools will result in the formed parts 3 having the shape according to the reference geometry 10.

The step of forming, including the abovementioned effects such as springback, is again simulated in the forming simulation 20, and based on the resulting sprung back part simulated model 30, the compensated tool geometry 38 and the corresponding process parameters are iteratively adapted, in a forming operation iteration loop, until the deviation of the sprung back part simulated geometry 31 from the reference geometry 10 is sufficiently small. In the sense of reducing or minimising this difference, the forming process 2 represented by the forming simulation 20 can be said to be optimised.

Given, for two or more formed parts 3, the optimised sprung back part simulation models 30 resulting from the respective optimised forming process 2 or forming simulation 20, the assembly simulation 40 is performed. The assembly simulation 40 simulates the assembly of the formed parts 3 on the basis of the sprung back simulation part model 30 and/or hemming and/or seaming operations involving the formed parts 3. The assembly simulation 40 can simulate the use of corresponding tools such as punches and pads as well as tools and/or robots for welding, soldering, gluing, nuts and bolts, rivets, according to tool-specific parameters like, for example, the diameter of a welding point.

The assembly simulation 40 typically also is an FEM simulation. In this case, the simulation begins with the parts in an initial condition as determined by the preceding forming simulation 20 for each part. This initial condition 30 thus comprises the respective sprung back part simulated geometry 31 and sprung back part simulated internal state 32.

The result of the assembly simulation 40 is an assembled sprung back part simulation model 50 comprising at least an assembled sprung back part simulated geometry 51 and, in certain embodiments, an assembled sprung back part simulated internal state 52. In a comparison step 55, the assembled sprung back part simulated geometry 51 is compared to the reference geometry 10. If the two do not match, in an assembly related adaptation step 57 the reference geometry 10 is modified, or, in other words, replaced by a further compensated reference geometry 70. The further compensated reference geometry 70 compensates for the abovementioned deformation caused by the assembly process 4, modelled by the assembly simulation 40, in addition to the abovementioned effects of the forming process.

The process is iteratively repeated with an outer iteration loop, beginning the forming simulation 20 based on the further compensated reference geometry 70, and including the forming operation iteration loop as an inner iteration loop, that is, the iterative adapting of the tool geometry and process parameters until the deviation of the sprung back part simulated geometry 31 from the further compensated reference geometry 70 is sufficiently small.

The comparison step 55 can be performed automatically, by computing an overall deviation and comparing it with a reference value. In embodiments, the comparison step 55 is performed by a human user. The human user can, for example, evaluate a visual representation of deviations of the assembled sprung back part simulated geometry 51 from the reference geometry 10 and based on this decide whether (further) modification of the reference geometry is required, or whether the method can terminate. Adaptation of the compensated reference geometry 70 can be performed, for example, by the user being guided by the visual representation of deviations.

The above process is inefficient in that in involves the repeated execution of the outer and inner loop until the deviation to nominal reference geometry 10 after the assembly simulation 40 is sufficiently small, which can be computationally expensive.

Figure 6:
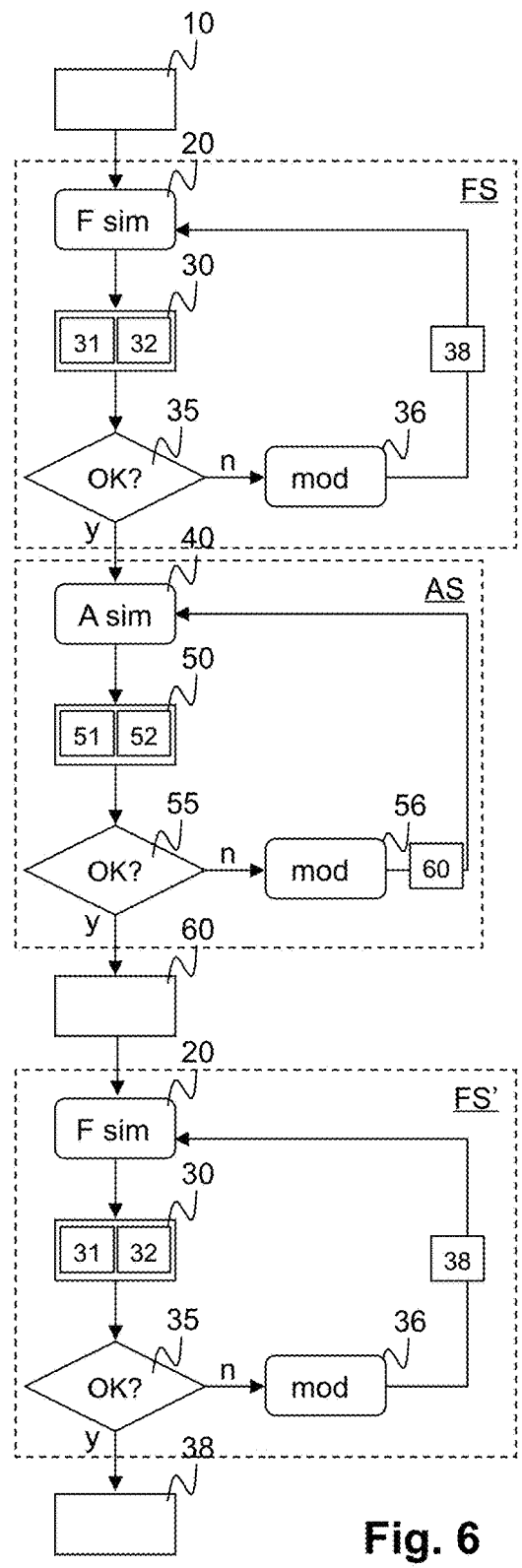
FIG. 6 a second method for designing the process of forming and assembling parts.

FIG. 6 represents a computationally more efficient approach to design the process of forming and assembling parts.

In an embodiment, steps FS related to the forming simulation 20, the sprung back part simulation model 30, the comparison 35 and determining the optimised forming process 2 are the same as explained in the context of FIG. 5.

In another embodiment, the steps FS related to the forming simulation 20 and determining the sprung back part simulation model 30 are performed only once, without iterative adaptation 36 of the tool geometry regarding the reference geometry 10.

Subsequently, a first pass of steps AS related to the assembly simulation 40 is performed as explained in the context of FIG. 5. This includes the comparison step 55, in which the assembled sprung back part simulated geometry 51 is compared to the reference geometry 10.

However, if the two do not match, in an assembly related adaptation step 56 a compensated sprung back part geometry 60 is modified (instead of the compensated reference geometry 70). This compensated sprung back part geometry 60 is then used instead of the sprung back part simulated geometry 31 for the assembly simulation 40.

Compared to the procedure of FIG. 5, the outer iteration loop based on the compensated reference geometry 70 is replaced by a computationally more efficient and faster iteration loop based on the compensated sprung back part geometry 60.

The compensated sprung back part geometry 60 compensates for the abovementioned deformation caused by the assembly process 4, represented by the assembly simulation 40. If the compensation is ideal, then shaping the parts prior to assembly according to the compensated sprung back part geometry 60 will result in parts in the assembly simulation 40 having the shape according to the reference geometry 10.

In embodiments, as presented with relation to FIG. 4, the compensation is determined by, for each point of the part, choosing the compensation vector 99 to be the inverse of the deviation vector 98 for that point.

The step of assembly 4, including the abovementioned deformation, is simulated in the assembly simulation 40, and based on the resulting assembled sprung back part simulated geometry 51, the compensated sprung back part geometry 60 and corresponding parameters of the assembly 4 operation are iteratively adapted, in an assembly operation iteration loop, until the deviation of the assembled sprung back part simulated geometry 51 from the reference geometry 10 is sufficiently small. In the sense of reducing or minimising this difference, the assembly 4 represented by the assembly simulation 40 can be said to be optimised. The corresponding compensated sprung back part geometry 60 is then said to be an optimised compensated sprung back part geometry 60.

In embodiments, the assembly operation loop is performed for only one or more parts of interest, and the other parts are not modified on the basis of the assembly simulation 40. For each part of interest, a corresponding optimised compensated sprung back part geometry 60 is determined.

In embodiments, there is only one part of interest, and the assembly operation loop is performed for exactly one part. Typically this is a part defining an outer surface of the assembled part 5 that will be visible to an end customer, such as an outer surface of a vehicle. In this case, only a single optimised compensated sprung back part geometry 60 is determined.

In embodiments, in the first pass of steps AS related to the assembly simulation 40, the assembly simulation 40 is based on the sprung back part simulation model 30, that is, the sprung back part simulated geometry 31 and the sprung back part simulated internal state 32. In subsequent iterations of the assembly simulation 40 following the first pass, the assembly simulation 40 is based on
the geometry defined by the compensated sprung back part geometry 60
in combination with the sprung back part simulated internal state 32 of the sprung back part simulation model 30.

The compensated sprung back part geometry 60 is created in the step of adaption of sprung back part geometry 56 as described earlier. It is a purely geometric model, defining the shape of the compensated sprung back part that will ideally result, after the assembly simulation 40, in the desired reference geometry 10. The sprung back part simulated internal state 32—representing e.g. internal stresses—is not perfectly correct for the modified geometry. However, it is sufficiently accurate to allow for an adequate assembly simulation 40. This makes it possible to quickly perform repeated iterations of the assembly operation iteration loop without the need to re-calculate the internal state that is used each time the assembly simulation 40 is performed with a different compensated sprung back part geometry 60.

In order to use the sprung back part simulated internal state 32 with the compensated sprung back part geometry 60, the sprung back part simulated geometry 31 is registered to the compensated sprung back part geometry 60, or vice versa. This creates a mapping between the two geometries. Using this mapping, the sprung back part simulated internal state 32 is then mapped to the shape of the compensated sprung back part geometry 60.

This makes it possible to quickly perform repeated iterations of the assembly operation iteration loop without the need to re-calculate the internal state that is used each time the assembly simulation 40 is performed with a different compensated sprung back part geometry 60.

In embodiments, based on each of the at least one optimised compensated sprung back part geometry 60, steps FS' related to the forming simulation 20 are performed once more, in particular as a forming operation iteration loop, determining a compensated tool geometry 38 and corresponding process parameters for creating the corresponding formed part 3 for which the difference of the sprung back part simulated geometry 31 and the optimised compensated sprung back part geometry 60 is sufficiently small. The result shall be called the optimised compensated tool geometry 38.

In embodiments, the steps AS related to the assembly simulation 40 are performed once, based on the sprung back part simulation model 30 resulting from the optimised compensated tool geometry 38, in order verify that the resulting assembled sprung back part simulated model 50, in particular the assembled sprung back part simulated geometry 51 and the assembled sprung back part simulated internal state 52—which depending on circumstances last was determined by the assembly simulation 40 is based on the geometry according to the compensated sprung back part geometry 60 in combination with a sprung back part simulated internal state 32—matches the reference geometry 10.

In summary, according to different embodiments, the following steps are performed in the sequence shown:

Embodiment 1 a) steps FS related to the forming simulation 20, determining the sprung back part simulation model 30 including the sprung back part simulated geometry 31 and the sprung back part simulated internal state 32 based on the reference geometry 10 in a single pass, that is, without a forming operation iteration loop;

b) steps AS related to the assembly simulation 40, determining the sprung back part simulated model 50, in particular the assembled sprung back part simulated geometry 51 and the assembled sprung back part simulated internal state 52 based on the sprung back part simulation model 30, and the optimised compensated sprung back part geometry 60 by means of an assembly operation iteration loop;

c) steps FS' related to the forming simulation 20, determining the sprung back part simulation model 30 including the sprung back part simulated geometry 31 and optionally the sprung back part simulated internal state 32 based on the optimised compensated sprung back part geometry 60, by means of the forming operation iteration loop. The result is the compensated tool 38 and corresponding process parameters for creating the corresponding formed part 3 respective the sprung back part simulation model 30.

Embodiment 2: like Embodiment 1, but with a forming operation iteration loop performed in step a).

Embodiment 3: like Embodiment 1, but with a single pass instead of the forming operation iteration loop performed in step c). In this case, the geometry of the tool and the process for creating the corresponding formed part 3 is determined by the compensated sprung back part geometry 60.

Embodiment 4: like Embodiment 2, but with a single pass instead of the forming operation iteration loop performed in step c).

While the invention has been described in present preferred embodiments of the invention, it is distinctly understood that the invention is not limited thereto, but may be otherwise variously embodied and practised within the scope of the claims.

The invention claimed is:

1. A method for manufacturing an assembled part, comprising a computer-implemented method for simulating and optimising a process of forming and assembling parts, wherein the process comprises
   at least one forming process using a forming tool for generating at least one associated formed part, in particular from a sheet metal blank, and
   an assembly process for generating an assembled part from the at least one formed part and at least one second part,
wherein the computer-implemented method comprises performing the following steps:
   in a forming simulation step, simulating the at least one forming process by a forming simulation, thereby generating a sprung back part simulation model corresponding to a reference geometry of the at least one formed part, the sprung back part simulation model comprising a sprung back part simulated geometry and a sprung back part simulated internal state;
   in an assembly simulation step, after the forming simulation step, simulating the assembly process by an assembly simulation, based on the sprung back part simulation model of the at least one formed part, and generating an assembled sprung back part simulated geometry;
   in a comparison step, after the assembly simulation step, comparing the assembled sprung back part simulated geometry to the reference geometry;
      if the assembled sprung back part simulated geometry does not match the reference geometry, continuing at the above assembly simulation step, using in the sprung back part simulation model a compensated sprung back part geometry instead of the sprung back part simulated geometry, thereby generating, in an assembly operation iteration loop, iterated versions of the assembled sprung back part simulated geometry;
      if the assembled sprung back part simulated geometry matches the reference geometry, continuing with the following final step, wherein
      the compensated sprung back part geometry corresponding to the assembled sprung back part simulated geometry that matches the reference geometry is considered to be an optimised compensated sprung back part geometry,
   in a final step of the computer-implemented method, after the comparison step, for the at least one formed part, determining a compensated tool geometry and parameters defining a corresponding process for manufacturing the at least one formed part with its sprung back part simulated geometry being based on the optimised compensated sprung back part geometry,
the method for manufacturing further comprising the following steps, in the following order,
   in a manufacturing step, manufacturing the forming tool with a shape defined by the compensated tool geometry,
   in the forming process, using the forming tool, manufacturing the at least one formed part from a blank, the forming tool determining a shape of the at least one formed part after the forming process;
   in the assembly process, manufacturing the assembled part by joining and assembling the at least one formed part and the at least one second part;
thereby causing, after the process of forming and assembling parts is performed, the at least one part to have a shape according to the reference geometry, with deformations caused by the forming process being compensated for according to the forming simulation step and deformations caused by the assembly process being compensated for according to the assembly operation iteration loop.

2. The method of claim 1, comprising determining an optimised compensated tool geometry in a forming operation iteration loop, by iteratively modifying the compensated tool geometry and performing the forming simulation based on the compensated tool geometry, generating iterated versions of a sprung back part simulated model until the sprung back part simulated geometry matches the optimised compensated sprung back part geometry.

3. The method of claim 1, wherein, when in the assembly operation iteration loop the compensated sprung back part geometry is iteratively adapted, in each of iteratively repeated assembly simulation steps the sprung back part simulation model used in the assembly simulation comprises
   the geometry according to the compensated sprung back part geometry determined after a preceding comparison step following a preceding assembly simulation step,
   in combination with a sprung back part simulated internal state that is part of the sprung back part simulation model determined in the forming simulation step preceding the iteratively repeated assembly simulation steps.

4. The method of claim 3, wherein, in order to use the sprung back part simulated internal state with the compensated sprung back part geometry, the sprung back part simulated geometry is registered to the compensated part geometry, or vice versa, creating a mapping between the two geometries, and based on this mapping, the sprung back part simulated internal state is mapped to the shape of the compensated sprung back part geometry.

5. The method of claim 1, wherein, in the step of simulating the at least one forming process by the forming simulation, thereby generating the sprung back part simulation model, the sprung back part simulation model is determined by a single execution of the forming simulation.

6. The method of claim 1, wherein, in the step of simulating the at least one forming process by the forming simulation, thereby generating the sprung back part simulation model, the sprung back part simulation model is determined by a forming operation iteration loop, replacing the forming tool geometry by an iteratively adapted tool geometry and performing the forming simulation until the deviation of the sprung back part simulated geometry from the reference geometry is smaller than a predetermined value.

7. The method of claim 1, wherein the assembly process comprises one or more of welding two or more parts, hemming and seaming of parts, and correspondingly the assembly simulation comprises one or more of a simulation of welding, hemming or seaming.

8. A method for designing a part to be manufactured using a tool, comprising performing the steps of claim 1 for simulating and optimising a process of forming and assembling parts thereby determining the optimised compensated sprung back part geometry, and manufacturing the part with a shape defined by the optimised compensated sprung back part geometry and optionally an assembly comprising the part.

9. A data processing system programmed to execute the computer-implemented steps of the procedure according to claim 1.

10. A method of manufacturing a non-transitory computer readable medium, comprising the step of storing, on the computer readable medium, computer-executable instructions which when executed by a processor of a computing system, cause the computing system to perform the computer-implemented method steps of claim 1.

11. A method for manufacturing a forming tool for manufacturing a part, comprising a computer-implemented method for simulating and optimising a process of forming and assembling parts, wherein the process comprises
- at least one forming process using the forming tool for generating at least one associated formed part, in particular from a sheet metal blank, and
- an assembly process for generating an assembled part from the at least one formed part and at least one second part, wherein the computer-implemented method comprises performing the following steps:
- in a forming simulation step, simulating the at least one forming process by a forming simulation, thereby generating a sprung back part simulation model corresponding to a reference geometry of the at least one formed part, the sprung back part simulation model comprising a sprung back part simulated geometry and a sprung back part simulated internal state;
- in an assembly simulation step, after the forming simulation step, simulating the assembly process by an assembly simulation, based on the sprung back part simulation model of the at least one formed part, and generating an assembled sprung back part simulated geometry;
- in a comparison step, after the assembly simulation step, comparing the assembled sprung back part simulated geometry to the reference geometry;
  - if the assembled sprung back part simulated geometry does not match the reference geometry, continuing at the above assembly simulation step, using in the sprung back part simulation model a compensated sprung back part geometry instead of the sprung back part simulated geometry, thereby generating, in an assembly operation iteration loop, iterated versions of the assembled sprung back part simulated geometry;
  - if the assembled sprung back part simulated geometry matches the reference geometry, continuing with the following final step, wherein the compensated sprung back part geometry corresponding to the assembled sprung back part simulated geometry that matches the reference geometry is considered to be an optimised compensated sprung back part geometry,
- in a final step of the computer-implemented method, after the comparison step, for the at least one formed part, determining a compensated tool geometry and parameters defining a corresponding process for manufacturing the at least one formed part with its sprung back part simulated geometry being based on the optimised compensated sprung back part geometry, the method for manufacturing further comprising, in a manufacturing step, manufacturing the forming tool with a shape defined by the compensated tool geometry, thereby causing, after the process of forming and assembling parts is performed, the at least one part to have a shape according to the reference geometry, with deformations caused by forming the parts being compensated for according to the forming simulation step and deformations caused by assembling the parts being compensated for according to the assembly operation iteration loop.

* * * * *